US007269273B2

(12) United States Patent
Murakami

(10) Patent No.: US 7,269,273 B2
(45) Date of Patent: Sep. 11, 2007

(54) IMAGE PROCESSING APPARATUS FOR EMBEDDING INFORMATION WITH A NOISE-MULTIPLEXED DISTRIBUTION, AND METHOD, COMPUTER PROGRAM, AND COMPUTER-READABLE STORAGE MEDIUM THEREFOR

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 939 days.

(21) Appl. No.: 10/600,533

(22) Filed: Jun. 23, 2003

(65) Prior Publication Data

US 2004/0001164 A1    Jan. 1, 2004

(30) Foreign Application Priority Data

Jun. 28, 2002  (JP)  ............... 2002-191125

(51) Int. Cl.
   *G06K 9/00*   (2006.01)
   *G06K 15/00*  (2006.01)
(52) U.S. Cl. .................... 382/100; 358/3.28
(58) Field of Classification Search ........... 382/100; 358/3.28; 713/176
   See application file for complete search history.

(56) References Cited

U.S. PATENT DOCUMENTS 5,530,759 A * 6/1996 Braudaway et al. ........ 713/176

(Continued)

FOREIGN PATENT DOCUMENTS

EP   0 725 529 A2   6/1996

(Continued)

OTHER PUBLICATIONS

Y. K. Lee and L. H. Chen, "High capacity image steganographic model," Proc. Inst. Elect. Eng., Vis. Image Signal Processing, vol. 147, No. 3, pp. 288-294, 2000.*

(Continued)

*Primary Examiner*—Colin LaRose
(74) *Attorney, Agent, or Firm*—Fitzpatrick, Cella, Harper & Scinto

(57) ABSTRACT

This invention can multiplex noise on multilevel image data to reversibly embed visible additional information with a noise-multiplexed distribution while maintaining the atmosphere of the multilevel image data subjected to embedding. For this purpose, in this invention, when noise is multiplexed on multilevel image data to embed visible additional information with a noise-multiplexed distribution, information representing whether or not to multiplex noise for each pixel is input as the additional information. Whether a pixel of interest in the multilevel image data is located at a position where noise is to be multiplexed is determined on the basis of the additional information (S106). When the pixel of interest is determined to be located at the position where noise is to be multiplexed, the second bit region where noise is to be multiplexed is specified on the basis of the first bit region in a bit configuration which constitutes the pixel of interest (S110). Bit information in the second bit region of the specified pixel of interest is changed (S112, S114).

12 Claims, 11 Drawing Sheets

U.S. PATENT DOCUMENTS

| | | | |
|---|---|---|---|
| 6,137,892 A * | 10/2000 | Powell et al. | 382/100 |
| 6,233,347 B1 | 5/2001 | Chen et al. | |
| 6,738,493 B1 | 5/2004 | Cox et al. | |
| 6,975,746 B2 | 12/2005 | Davis et al. | |
| 6,996,248 B2 | 2/2006 | Fudge et al. | |
| 7,174,030 B2 * | 2/2007 | Sugahara et al. | 382/100 |
| 2001/0017709 A1 | 8/2001 | Murakami et al. | |
| 2002/0002679 A1 | 1/2002 | Murakami et al. | |
| 2003/0099373 A1 * | 5/2003 | Joo et al. | 382/100 |
| 2006/0115112 A1 * | 6/2006 | Yeung et al. | 382/100 |

FOREIGN PATENT DOCUMENTS

| | | |
|---|---|---|
| JP | 05-110971 | 4/1993 |
| JP | 8-241403 | 9/1996 |
| JP | 8-256321 | 10/1996 |
| JP | 2000-184173 | 6/2000 |

OTHER PUBLICATIONS

Y. Hu and S. Kwong, "Wavelet domain adaptive visible watermarking," Electron. Lett., vol. 37, Sep. 2001.*

S. P. Mohanty, K. R. Ramakrishnan, and M. S. Kankanhalli, "A DCT domain watermarking technique for images," in Proc. IEEE Int. Conf. Multimedia Expo, 2000, pp. 1029-1032.*

H. Daren, L. Jiufen, H. Jiwu, and L. Hongmei, "A DWT-Based Image Watermarking Algorithm," Proceedings of the IEEE International Conference on Multimedia and Expo, pp. 429-432, 2001.*

S. D. Lin and C.-F. Chen, "A Robust DCT-Based Watermarking for Copyright Protection," IEEE Transactions on Consumer Electronics, 46(3), Aug. 2000, pp. 415-421.*

J.Huang, Y. Q.Shi, and Y.Shi, "Embedding image watermarks in DC components," IEEE Trans. Circuits Syst. Video Technol., vol. 10, pp. 974-979, Sep. 2000.*

* cited by examiner

FIG. 3A

| | DETERMINATION BIT REGION | | ARITHMETIC BIT REGION | | | | | | |
|---|---|---|---|---|---|---|---|---|---|
| | B7 | B6 | B5 | B4 | B3 | B2 | B1 | B0 | $\Delta_{max}$ |
| FOR S=1 | 1 | 1 | Y | Y | Y | Y | Y | Y | 63 |
| | 1 | 0 | | Y | Y | Y | Y | Y | 31 |
| | 0 | 1 | | | Y | Y | Y | Y | 15 |
| | 0 | 0 | | | | Y | Y | Y | 7 |

301 (table), 302 ($\Delta_{max}$ column)

FIG. 3B

| | DETERMINATION BIT REGION | | ARITHMETIC BIT REGION | | | | | | |
|---|---|---|---|---|---|---|---|---|---|
| | B7 | B6 | B5 | B4 | B3 | B2 | B1 | B0 | $\Delta_{max}$ |
| FOR S=2 | 1 | 1 | | Y | Y | Y | Y | Y | 31 |
| | 1 | 0 | | | Y | Y | Y | Y | 15 |
| | 0 | 1 | | | | Y | Y | Y | 7 |
| | 0 | 0 | | | | | Y | Y | 3 |

FIG. 3C

| | DETERMINATION BIT REGION | | ARITHMETIC BIT REGION | | | | | | |
|---|---|---|---|---|---|---|---|---|---|
| | B7 | B6 | B5 | B4 | B3 | B2 | B1 | B0 | $\Delta_{max}$ |
| FOR S=3 | 1 | 1 | | | Y | Y | Y | Y | 15 |
| | 1 | 0 | | | | Y | Y | Y | 7 |
| | 0 | 1 | | | | | Y | Y | 3 |
| | 0 | 0 | | | | | | Y | 1 |

IMAGE PROCESSING APPARATUS FOR EMBEDDING INFORMATION WITH A NOISE-MULTIPLEXED DISTRIBUTION, AND METHOD, COMPUTER PROGRAM, AND COMPUTER-READABLE STORAGE MEDIUM THEREFOR

FIELD OF THE INVENTION

The present invention relates to an image processing apparatus and method which perform conversion for degrading the image quality and inversion for removing the image quality degradation for digital image data of a still or moving image in order to protect the copyright of the image, a computer program, and a computer-readable storage medium.

BACKGROUND OF THE INVENTION

A digital image used to process an image as digital data can be easily copied by a computer or the like and transmitted via a communication line without degrading the image quality, compared to a conventional analog image. This feature, however, makes it easy to illicitly copy and redistribute a digital image having a copyright or the like.

To prevent this, there is known a digital watermark method. Digital watermarks are roughly classified into an invisible digital watermark obtained by invisibly embedding watermark information such as copyright information or user information, and a visible digital watermark obtained by visibly forming in an image a watermark image such as the logotype of a company having a copyright.

As for the invisible digital watermark, embedded watermark information cannot be recognized or is hardly recognized in an embedded image at a glance. Watermark information is rarely deleted, but is illicitly copied and distributed more frequently than visible watermark information. Even if a digital image is illicitly copied or distributed, watermark information remains in the digital image. An illicit user can be specified by a user ID or the like embedded as the watermark information.

As for the visible digital watermark, watermark information is visibly written in a digital image. It is difficult to directly utilize the digital image, suppressing illicit copying and illicit distribution. As a conventional visible digital watermark embedding method, the pixel value of an image representing copyright information such as the logotype of a copyright holder is replaced with the pixel value of an original image, embedding copyright information in the original image. The drawback of this method is that the original image cannot be reconstructed without difference information because the pixel value of the original image is lost.

In online sales of a digital image via the Internet or the like, the copyright is protected by not fully disclosing digital contents before purchase. The user grasps rough contents of the image, and then purchases the image.

To achieve this purpose, a digital content distributor uses a method of disclosing or distributing a reduced image (thumbnail image) or an image prepared by intentionally degrading the image quality of all or part of an original image in order to present rough contents of the image to the customer.

One candidate of a means for degrading the image quality is a visible digital watermark containing the logotype of a copyright holder or the like. If the visible digital watermark is not reversible, the original image of a degraded-quality portion must be transmitted again. In this case, retransmission of only a key is safer than retransmission of the original image via a network in terms of the communication amount and tapping in retransmission. Online image delivery services require a method of removing image quality degradation by using a key.

One of the techniques is a semi-disclosure technique. According to the semi-disclosure technique, bit information at an arbitrary bit position is extracted in an arbitrary region of an original image, and subjected to arithmetic processing such as encryption based on a key, degrading the image quality of the original image.

In the use of the semi-disclosure technique, bit information of part of an original image is saved, and conversion processing based on a key is performed for an extracted bit string to control the image quality of an image to be disclosed. Inversion processing based on a key is done to reconstruct the original image from the quality-degraded image.

An example of the semi-disclosure technique is disclosed in Japanese Patent Laid-Open No. 8-256321. This reference proposes a method of extracting part of the bit string of an image which is compression-coded by JPEG or MPEG compression coding, directly converting the extracted bit string by an independently defined conversion method without referring to a part other than the extracted part, and decoding the image.

If the user wants to purchase the original image of a distributed image whose quality is degraded, he/she acquires a key used to convert the bit string. The user can acquire a completely reconstructed content from the partially scrambled image and the key.

This method preserves the feature of an original image, but is a kind of scramble (encryption). This method does not fully consider the image quality against noise added by conversion processing.

More specifically, the image quality degradation of an image to be converted (scrambled) is determined by only a uniformly extracted bit string set in advance regardless of the feature of the image or the like. This method does not consider the human visual characteristic which is less sensitive to a change in luminance at a high luminance value and sensitive to a change at a low luminance value. The image quality degradation is not uniform at any grayscale.

In other words, there is a demand for a method of adding proper noise which allows the image appreciator to satisfactorily confirm the outline of an image.

SUMMARY OF THE INVENTION

The present invention has been made to overcome the conventional drawbacks, and has as its object to provide an image processing apparatus and method which multiplex noise on multilevel image data to reversibly embed visible additional information with a noise-multiplexed distribution while maintaining the atmosphere of multilevel image data subjected to embedding, a computer program, and a computer-readable storage medium.

It is another object of the present invention to provide an image processing apparatus and method capable of removing additional information to reconstruct an original image or an image almost identical to the original image, a computer program, and a computer-readable storage medium.

To achieve the above objects, an image processing apparatus according to the present invention has the following arrangement.

That is, an image processing apparatus which multiplexes noise on multilevel image data to embed visible additional information with a noise-multiplexed distribution comprises:

input means for inputting, as the additional information, information representing whether or not to multiplex noise for each pixel, determination means for determining on the basis of the additional information whether a pixel of interest in the multilevel image data is located at a position where noise is to be multiplexed, specifying means for, when the determination means determines that the pixel of interest is located at the position where noise is to be multiplexed, specifying a second bit region where noise is to be multiplexed, on the basis of a state of a first bit region in a bit configuration which constitutes the pixel of interest, and change means for reversibly changing bit information for the second bit region of the pixel of interest specified by the specifying means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 3A, 3B, and 3C are tables showing arithmetic bit region determination tables for respective visual intensities;

DETAILED DESCRIPTION OF THE PREFERRED EMBODIMENTS

Preferred embodiments of the present invention will be described below with reference to the accompanying drawings.

<Description of Premise>

Figure 10:
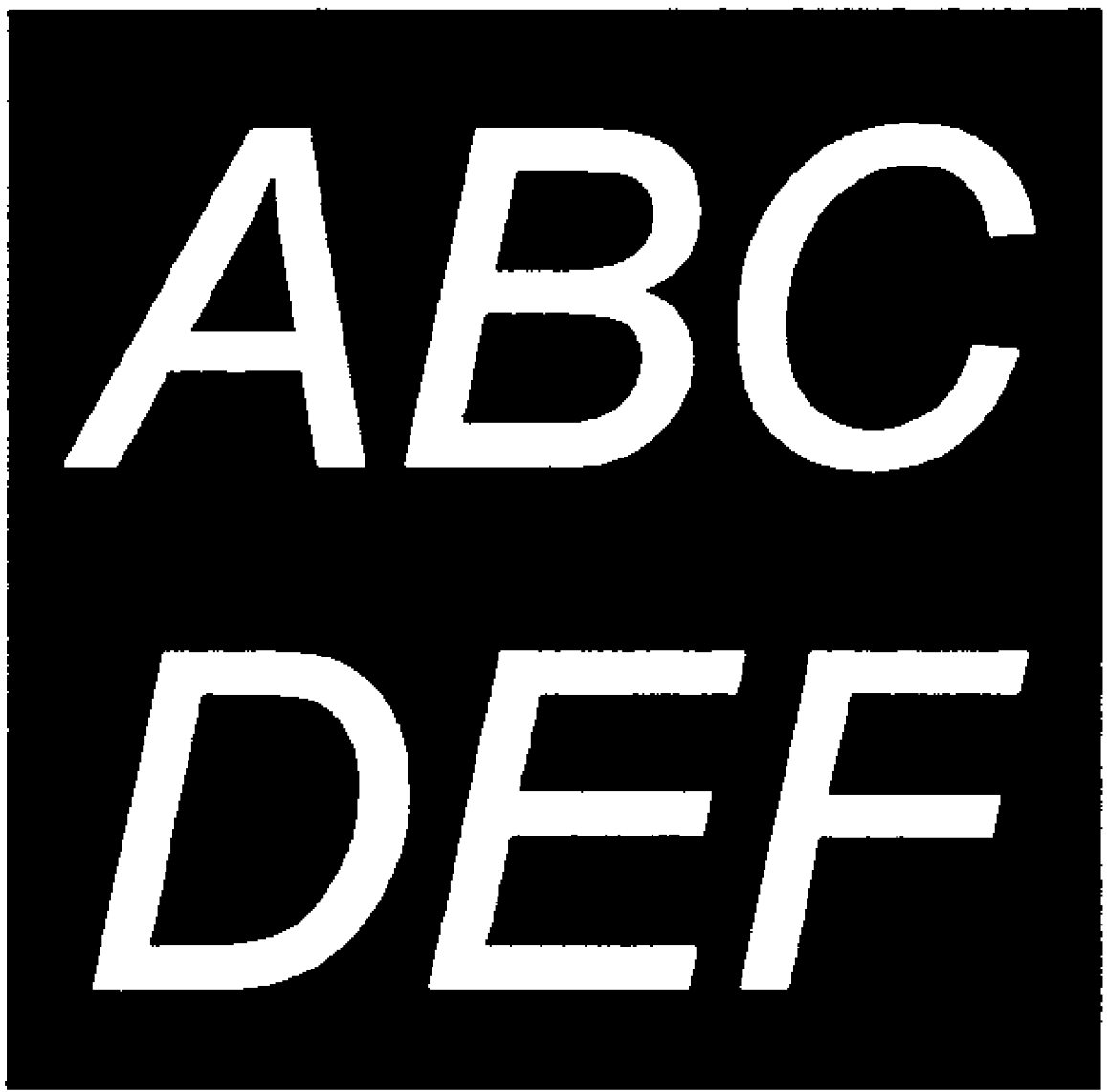
FIG. 10 is a view showing an example of watermark image shape information in the embodiment.

FIG. 10 shows an example of image shape information for specifying a position subjected to arithmetic processing of degrading the image quality within an image in the embodiment. The image shape information will be called "watermark image shape information".

Watermark image shape information can be any image information such as the logotype of a copyright holder, an image photographing date and time, a personal name, a company name, a logotype, or an impressive pattern. Watermark image shape information may be a region of interest (e.g., a morbid portion of a medical image) in an embedding target image.

In the following embodiments, watermark image shape information is a mask having information of 1-bit pixels (binary) which defines a position where a visible digital watermark is embedded, as shown in FIG. 10. In FIG. 10, a digital watermark is embedded in a white (pixel "1") alphabet region, and an original image is presented through a black (pixel "0") pixel (which is a region where the original image is not processed).

In the following embodiments, arithmetic processing of degrading the image quality is performed at only the spatial position of part of an image. However, arithmetic processing of degrading the image quality of an entire image also falls within the scope of the present invention.

In the following embodiments, a component subjected to arithmetic processing of degrading the image quality is a luminance component which constitutes a color image. Since the color component does not change upon operating the luminance component, the brightness seems to have changed in appearance.

The human visual characteristic to luminance is nonlinear such that a change in luminance is hardly perceived at a high luminance and easily perceived at a low luminance. The human perception to the luminance component is relatively well known, and the luminance component is preferable as a component subjected to arithmetic processing of degrading the image quality on the basis of the human visual characteristic.

However, a component used to embed a visible digital watermark is not limited to a luminance component. R (Red), G (Green), and B (Blue) components can also be operated with good balance such that the image quality degradation can be uniformly sensed while preserving the feature of the image. This also applies to other components (e.g., C (Cyan), M (Magenta), and Y (Yellow)).

For descriptive convenience, an input image is an 8-bit grayscale image (monochrome grayscale image). An image comprised of R (Red), G (Green), and B (Blue) color components, or an image comprised of Y (Luminance) and U and V (two color difference components) color components can also be processed by a method according to the embodiments of the present invention.

First Embodiment

The first embodiment of the present invention will be described below with reference to the accompanying drawings.

Figure 11:
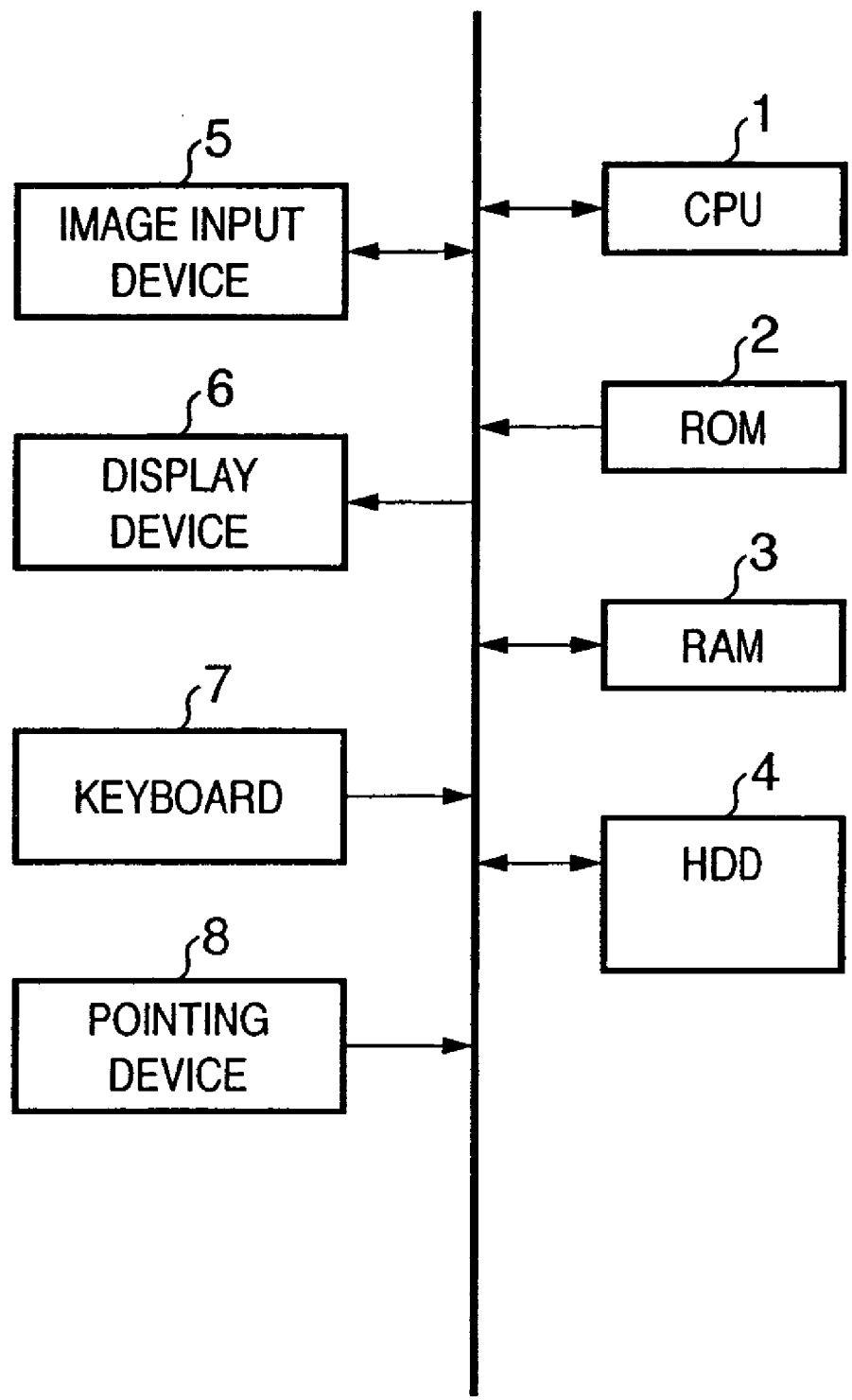
FIG. 11 is a block diagram showing an example of an apparatus according to the embodiment.

FIG. 11 is a block diagram showing an information processing apparatus which processes an image in the first embodiment. In FIG. 11, reference numeral 1 denotes a CPU which controls the whole apparatus; 2, a ROM which stores a boot program, BIOS, and the like; and 3, a RAM used as a work area for the CPU 1. An OS, image processing program, or the like is loaded to the RAM 3 and executed. Reference numeral 4 denotes a hard disk device serving as an external storage device for storing an OS, image processing program, and image data files (including files before and after processing); 5, an image input device such as an image scanner, a digital camera, a storage medium (memory card, flexible disk, CD-ROM, or the like) which stores an image file, or an interface for downloading an image from a network; 6, a display device which displays an image and provides GUI for performing various operations; 7, a keyboard; and 8, a pointing device used to designate a desired position on a display screen and select various menus.

The apparatus having the above arrangement is powered on, and the OS is loaded to the RAM 3. An image processing program in the first embodiment is loaded to the RAM 3 and executed in accordance with a user instruction or automatic activation setting.

Figure 1:
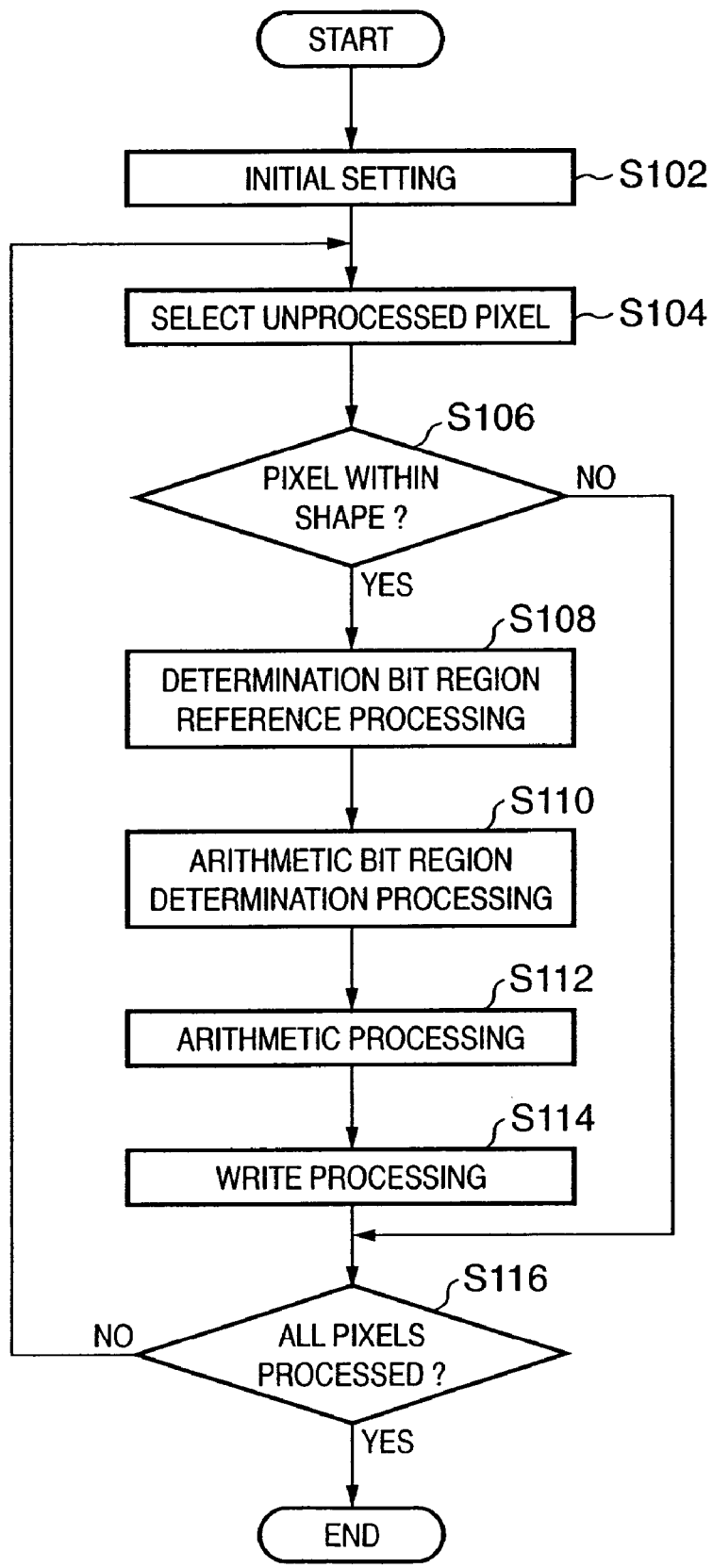
FIG. 1 is a flow chart of a reversible noise addition apparatus according to the first embodiment.

FIG. 1 is a flow chart showing reversible noise addition processing as image processing according to the first embodiment of the present invention.

In step S102 of FIG. 1 as an initial setting step, an original image I comprised of a plurality of pixels each having a pixel position and pixel value, watermark image shape information M comprised of a pixel position representing the shape of a region where noise is added into an image, a random number key R for generating a predetermined serial bit sequence expressed by binary numbers, an arithmetic bit region determination table T which defines a bit region subjected to arithmetic processing among pixel values, a visible intensity value S which defines the intensity of noise to be added, and an output image W identical to the input original image I are set.

The original image I may be an image directly input from the image input device 5 or an image file temporarily saved in the HDD 4. The image shape information M is information stored in the HDD 4 in advance, but may be freely created by the user. As for the random number key R, a function (program) for generating a random number may be executed. The arithmetic bit region determination table T and visible intensity value S may be input from the keyboard or the like, or may be saved as a file in the HDD in advance. The output destination of the output image W is the HDD 4. The serial bit sequence may be fixed for the entire image, but is changed in accordance with the image embedding position on the basis of the random number key R in order to enhance security.

In step S104, an unprocessed pixel is selected from the input image. In step S106, a position in watermark image shape information that corresponds to the pixel position, i.e., whether the pixel position is position "1" in image shape information (in this embodiment, a watermark image is embedded at a white pixel position in FIG. 10, as described above) is determined. If the current pixel is a pixel subjected to embedding (multiplexing), the pixel position information is transferred to step S108. If NO in step S106, processing for the pixel ends.

In step S108, bit information of a determination bit region in the pixel value of the original image selected in step S104 is read out. The determination bit region, which will be described in detail later, is used to determine a pixel value, and is a bit region not subjected to arithmetic processing.

In step S110, an arithmetic bit region to be processed by arithmetic processing in step S112 is determined on the basis of the determination bit region read out in step S108 and the visible intensity value S. Arithmetic bit region determination processing in step S110 will be described in detail later. By determining an arithmetic bit region and non-arithmetic bit region, a noise range to be added to the image can be determined, and the image quality of a noise-added region can be controlled.

In step S112, arithmetic processing is performed between the bit of the arithmetic bit region determined in step S110 and a serial bit sequence generated from the random number key R input by initial setting in step S102. This arithmetic processing must be reversible. Arithmetic processing includes all reversible arithmetic processes such as exclusive-OR calculation, modulo addition, and modulo multiplication.

In step S114, processing of writing the value of the bit region of a corresponding input pixel in the output image W by the value of the processed arithmetic bit region is executed.

In step S116, whether all pixels have been processed is determined. If NO in step S116, processing returns to step S104 to continue the above-described processing until all pixels have been processed.

The outline of the reversible noise addition apparatus according to the first embodiment has been described. Reversible noise addition processing will be explained in more detail.

Figure 2:
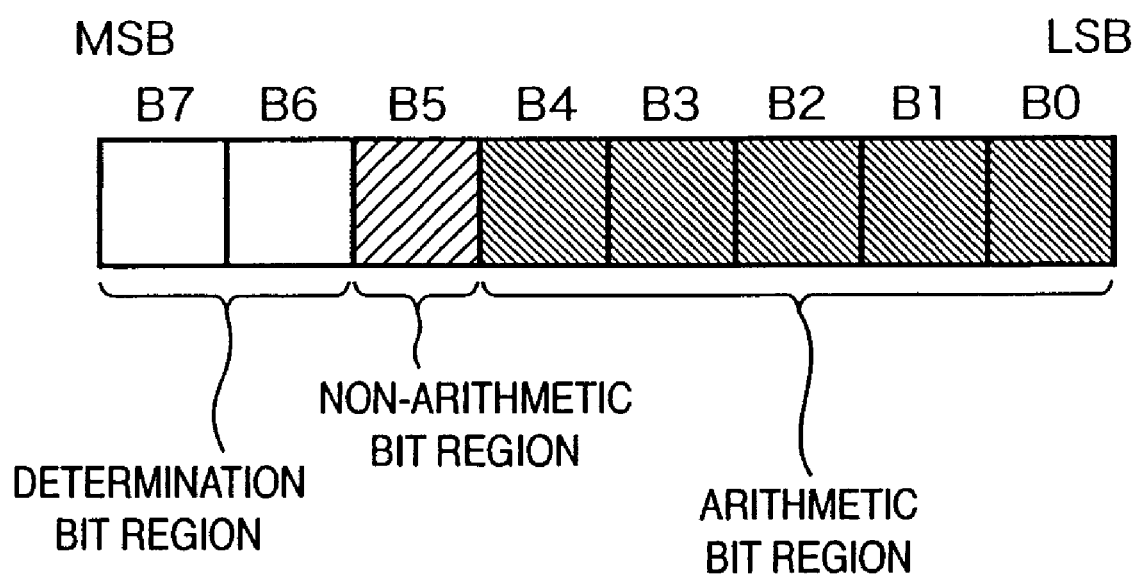
FIG. 2 is a view showing an example of a determination bit region, arithmetic bit region, and non-arithmetic bit region.

FIG. 2 is a view showing a state in which a pixel value (in this case, the luminance component value of each pixel) expressed by 8 bits is expressed by binary bits. The MSB (most significant bit) is B7, and the LSB (least significant bit) is B0. Intermediate bits are expressed as B6, B5, B4, B3, B2, and B1 in a descending order.

FIG. 2 illustrates a determination bit region, arithmetic bit region, and non-arithmetic bit region.

Simply stated, the determination bit is used to determine whether the luminance of a pixel is high or low and to determine the range of the arithmetic bit region, and is fixed. In the first embodiment, upper 2 bits including the MSB in the pixel value (8 bits) are assigned to this region. The arithmetic bit region changes in size in accordance with the value of the determination bit region, and may change. The non-arithmetic bit region also changes in size in accordance with the value of the determination bit region, and is not subjected to any operation (change). In the first embodiment, the determination bit region is comprised of upper 2 bits (B7 and B6) including the MSB, and the sum of the number of bits of the arithmetic bit region and the number of bits of the non-arithmetic bit region is 6.

In determination bit region reference processing of step S108, the bit value of the determination bit region of an input pixel (8 bits) is read out. In other words, the rough value of a target pixel is referred to. In step S108, the bit values of the arithmetic bit region and non-arithmetic bit region are not determined yet.

FIGS. 3A to 3C show examples of the arithmetic bit region determination table T used in arithmetic bit region determination processing of step S110.

FIG. 3A shows the contents of the arithmetic bit region determination table T when the visible intensity value is highest (visible intensity value S=1). FIG. 3B shows the contents of the table when the visible intensity is intermediate (visible intensity value S=2). FIG. 3C shows the contents of the table when the visible intensity value is lowest (visible intensity value S=3). The visible intensity is highest at S=1 for descriptive convenience. In short, the visible intensity has a plurality of levels, and one of the levels is specified. The number of intensity levels is not limited to three. For example, four patterns of the arithmetic bit region in FIG. 3B are smaller by one bit than corresponding patterns in FIG. 3A. If the number of bits of some of the patterns is decreased and the number of bits of each of the remaining patterns is set equal, four or more levels can be defined.

For descriptive convenience, a case wherein the visible intensity S is highest (S=1) will be explained.

In the arithmetic bit region determination table T (301 in FIG. 3A), the bit value of the determination bit region (B7 and B6) is defined in correspondence with the arithmetic bit region. A bit position "Y" in the arithmetic bit region 301 represents an arithmetic bit region, and a blank bit position represents a non-arithmetic bit region. That is, the arithmetic bit region is given by the function of the bit value of the determination bit region.

For example, when the arithmetic bit region determination table 301 is referred to for the bit value of B7 (MSB)=1 and the bit value of B6=0 at a predetermined visible intensity value, the arithmetic bit region is defined by B4, B3, B2, B1, and B0 (lower 5 bits including the LSB), and the non-arithmetic bit region is defined by one bit of the remaining B5. As is apparent from FIG. 3A, the number of bits of the arithmetic bit region is larger for a higher luminance, and the arithmetic bit region is smaller for a lower luminance. Since the human visual characteristic is sensitive to a low luminance, as described above, the image quality degradation by changing the bits of the arithmetic bit region is minimized. The human visual sense is low for a high luminance, and the arithmetic bit region can be large.

As is apparent from FIG. 3A, the distribution of the arithmetic bit region shown in FIG. 2 corresponds to B7 and B6=1.

The case wherein the visible intensity value is highest has been described. For the visible intensity value S=2 in FIG. 3B, the arithmetic bit region is smaller by one bit in comparison with S=1 in FIG. 3A. For S=3, the arithmetic bit region is smaller by another bit.

Figure 4:
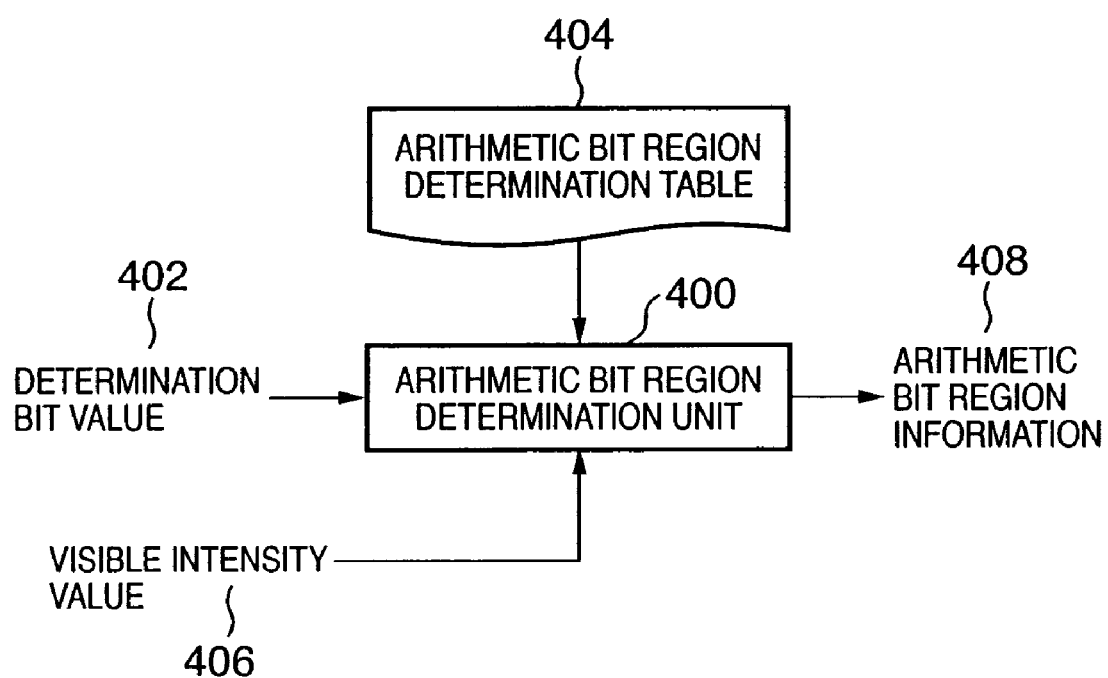
FIG. 4 is a block diagram showing the internal arrangement of an arithmetic bit region determination unit which executes arithmetic bit region determination processing.

FIG. 4 is a block diagram showing an arithmetic bit region determination unit which executes arithmetic bit region determination processing of step S110.

An arithmetic bit region determination unit 400 receives a bit value 402 of the determination bit region from the determination bit region reference processing means in step S108, and the initially set visible intensity value S and arithmetic bit region determination table T. As described above, the arithmetic bit region determination unit 400 determines an arithmetic bit region on the basis of the bit value of the determination bit region, the arithmetic bit region determination table T, and the visible intensity value S, and outputs the arithmetic bit region as arithmetic bit region information.

Figure 5:
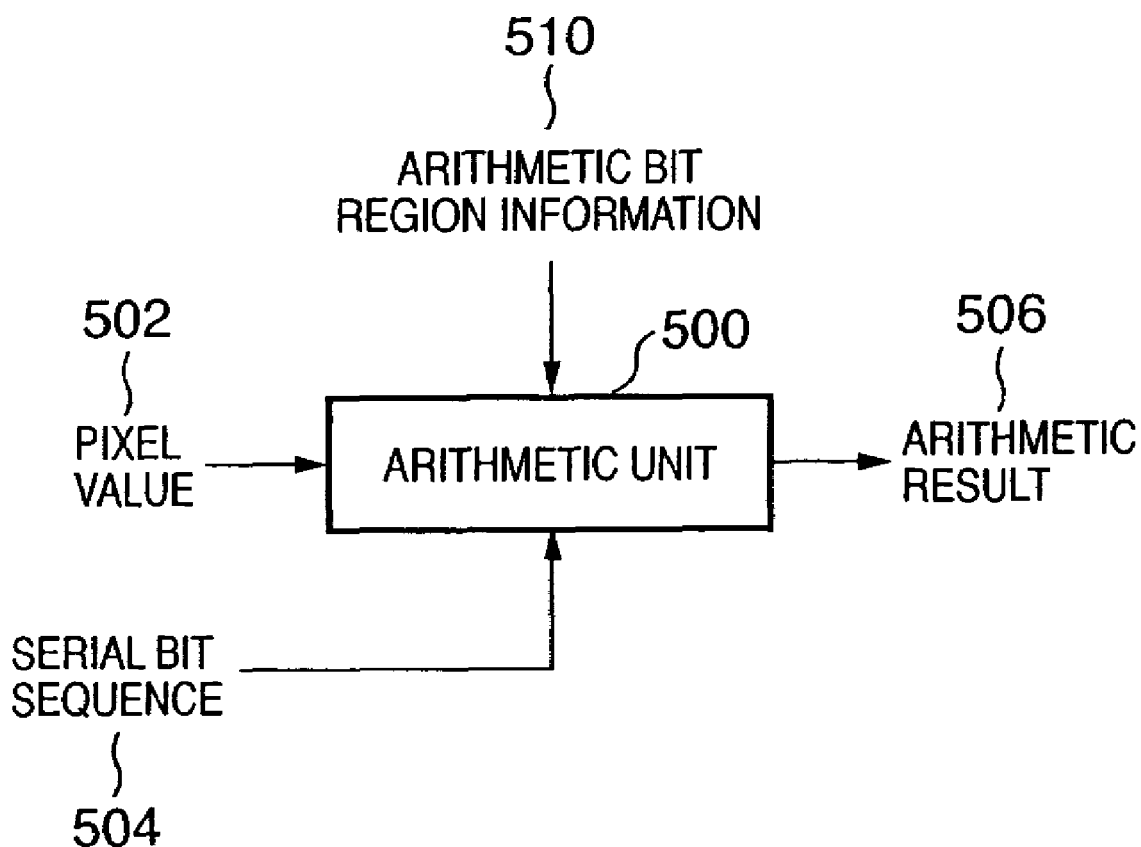
FIG. 5 is a block diagram showing the internal arrangement of an arithmetic unit which executes arithmetic processing.

FIG. 5 is a block diagram showing an arithmetic unit which executes arithmetic processing of step S112.

An arithmetic unit 500 receives an input pixel value 502 to be processed, a serial bit sequence 504 which is generated from the random number key R and changes depending on the position, and arithmetic bit region information 510 determined in step S110. The arithmetic unit 500 executes arithmetic processing on the basis of a predetermined reversible arithmetic method, and outputs an arithmetic result 506.

An example of the operation of the arithmetic unit 500 according to the first embodiment will be described with reference to FIG. 6.

Figure 6:
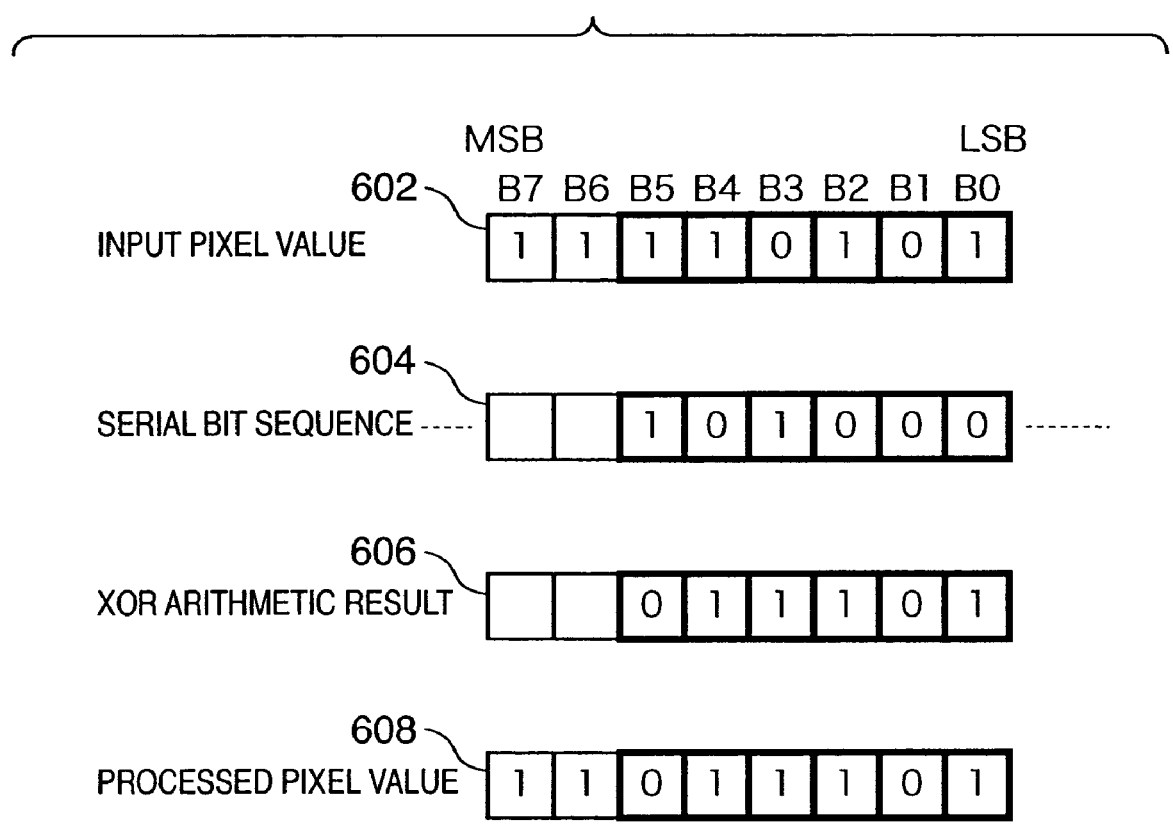
FIG. 6 is a view showing an example of contents of arithmetic processing.

In FIG. 6, reference numeral 602 denotes an input pixel value; 604, a serial bit sequence (region within a thick frame is referred to) generated from the random number key R; 606, an exclusive-OR (XOR) result of an input pixel and a corresponding bit position in a serial bit sequence; and 608, an output pixel having undergone arithmetic processing. A bit position surrounded by a thick frame is an arithmetic bit region.

As described above, an arithmetic bit region is determined by referring to the determination bit region of the input pixel 602. A bit position surrounded by the thick frame in the input pixel 602 is an arithmetic bit region.

The serial bit sequence 604 serves as a key for decoding a pixel. A serial bit sequence corresponding to a region other than the arithmetic bit region is not required (even if such region exists, it is ignored).

A value in the thick frame in the exclusive-OR 606 is the arithmetic processing result (in this case, exclusive-OR) of the arithmetic bit region of an input pixel and the bit region of a corresponding serial bit sequence.

The output pixel 608 is a result of writing the arithmetic processing result 606 as the value of the arithmetic bit region of a corresponding input pixel.

In FIG. 6, the difference between the pixel value of the arithmetic result and the original pixel value (B means a binary number in the following description) is

11011101(*B*)−11110101(*B*)=221−245=−24

This means that the pixel value of interest has changed by "−24".

When six bits B5, B4, B3, B2, B1, and B0 form an arithmetic bit region and the entire arithmetic bit region is inverted, a pixel value change of $2^5+2^4+2^3+2^2+2^1+2^0=32+16+8+4+2+1=63$ ($x^y$ represents the yth power of x) is realized at maximum.

If the arithmetic bit region is small (the luminance of an input pixel is smaller), the number of bits of the arithmetic bit region decreases, and the number of bits of the non-arithmetic bit region increases. The maximum change amount decreases, reducing a visual change.

In this way, the first embodiment introduces processing of determining an arithmetic bit region from the determination bit region. Part of image information can be saved, and at the same time the maximum change amount ($\Delta$max) of the pixel value can be determined in accordance with the pixel value of an original image.

In FIG. 3A, reference numeral 302 denotes a maximum change amount ($\Delta$max) of a pixel value corresponding to the arithmetic bit region determination table 301 when the visible intensity value is maximum. The above description also applies to FIGS. 3B and 3C.

The randomized effect of the bit of the arithmetic bit region by arithmetic processing in step S112 of FIG. 1 is predicted. By determining an arithmetic bit region, a random luminance change within the maximum change amount $\Delta$max can be realized within the watermark image shape region where noise is added.

The human visual characteristic is more sensitive to a change in luminance value at a lower luminance value and less sensitive to a change in luminance value at a higher luminance value. The arithmetic bit region (maximum change amount $\Delta$max) is preferably designed in consideration of the human visual characteristic.

FIGS. 3A to 3C show examples of the arithmetic bit region determination table designed in consideration of the human visual characteristic.

Uniform color spaces CIE 1976 L*u*v* and CIE 1976 L*a*b* (to be referred to as an L*a*b* color space hereinafter) in which a color change in the space coincides with a change in color appearance have been recommended by CIE since 1976. The uniform color space is also effective for determining the maximum change amount $\Delta$max.

A reversible noise removal apparatus according to the first embodiment will be briefly described.

Figure 7:
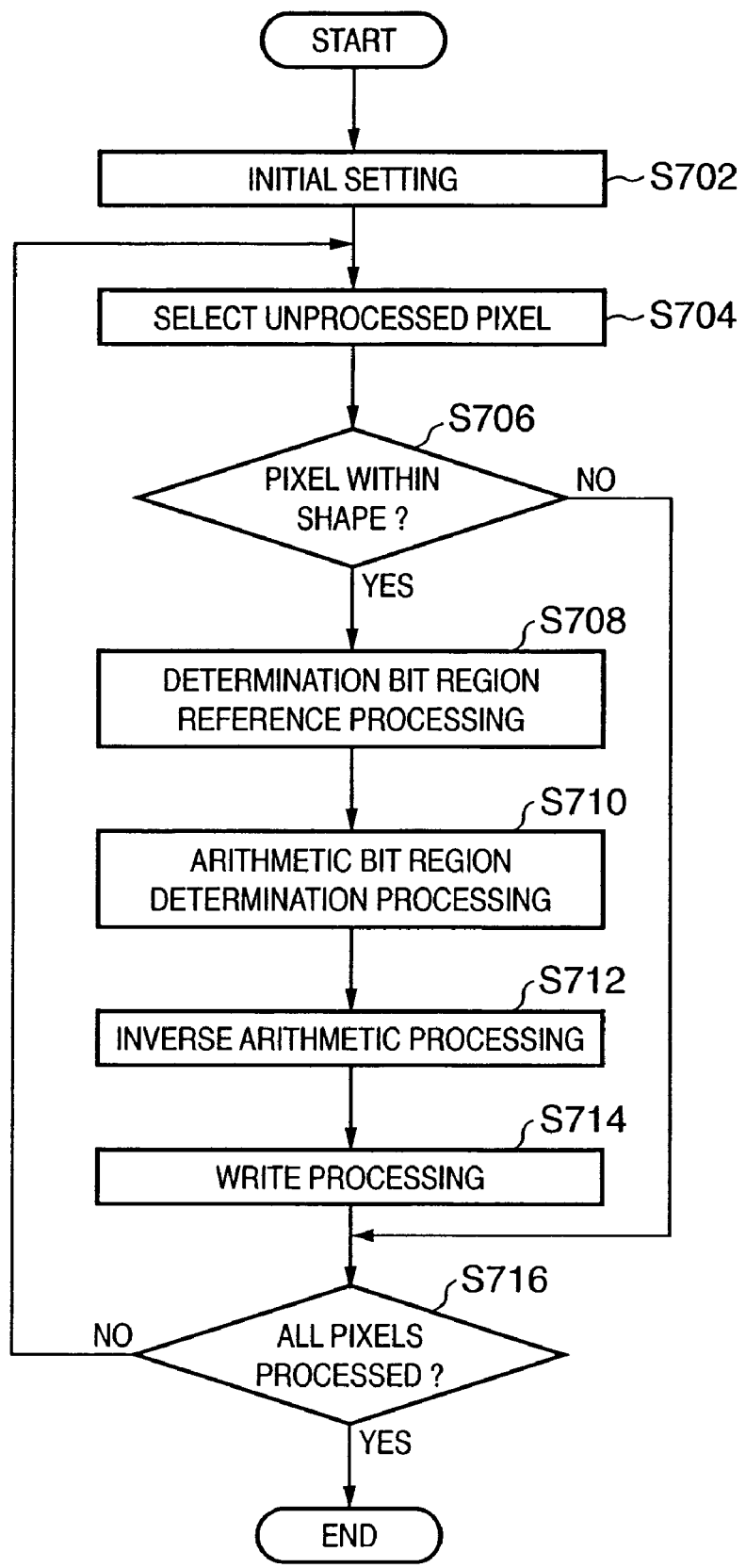
FIG. 7 is a flow chart of a reversible noise removal apparatus according to the first embodiment.

FIG. 7 is a flow chart showing reversible noise removal processing according to the first embodiment. Reversible noise removal processing according to the first embodiment can be realized by almost the same processing as reversible noise addition processing. Similar to the apparatus which performs multiplexing processing, the apparatus arrangement can be implemented by a general-purpose information processing apparatus (e.g., personal computer), and a description thereof will be omitted.

In initial setting of step S702, an image W comprised of a plurality of pixels each having a pixel position and pixel value, watermark image shape information M representing the shape of a region wherein noise is added into an image, a random number key R for generating a predetermined serial bit sequence expressed by binary numbers, an arithmetic bit region determination table T which defines a bit region subjected to arithmetic processing among pixel values, and a visible intensity value S which defines the intensity of noise to be added are input. An output image E is set to an image identical to the input image W.

The watermark image shape information M, random number key R, arithmetic bit region determination table T, and visible intensity value S are key information for removing noise.

In step S704, unprocessed pixel data of the input image is read out. In step S706, a position of the readout pixel that corresponds to the original image is compared with watermark image shape information, and whether the position coincides with the pixel position of a noise addition portion is determined. If YES in step S704, the pixel position information is transferred to step S708; if NO, processing for the pixel ends.

In step S708, bit information of a determination bit region in the pixel value of the original image designated in step S704 is read out.

In step S710, an arithmetic bit region to be processed by arithmetic processing in step S712 is determined on the basis of the determination bit region value read out in step S708.

In step S712, inverse arithmetic processing is performed between the bit of the arithmetic bit region determined in step S710 and a serial bit sequence generated from the random number key input by initial setting in step S702. This arithmetic processing is inverse arithmetic processing (decoding processing) corresponding to arithmetic processing in embedding.

Inverse arithmetic processing is reversible, which is apparent from the fact that, in the example of FIG. 6, a processed pixel value and serial bit sequence are exclusive-ORed to completely restore an "input pixel value" in FIG. 6.

In step S714, processing of writing the value of the bit region of a corresponding input pixel in the output image E by the value of the processed arithmetic bit region is executed.

In step S716, whether all pixels have been processed is determined. If NO in step S716, processing returns to step S704 to continue the above-described processing until all pixels have been processed.

The operation of the reversible noise removal apparatus according to the first embodiment has been described. Noise removal processing is basically almost the same as noise embedding processing.

As described above, the first embodiment can set the pixel value change amount such that the noise amount added by arithmetic processing changes in accordance with the image grayscale in a region represented by watermark image shape information of an original image while maintaining the feature of an original image. In addition, no original image is required for removing added noise. Introduction of high-security cryptography to arithmetic processing makes it difficult to remove added noise.

The arithmetic bit region determination table T is used to determine an arithmetic bit region. An arithmetic bit region determination function F expressed by a formula can also be used, and this method also falls within the scope of the present invention.

In the first embodiment, the determination bit region is defined by 2 bits starting from the MSB out of 8 bits which constitute a pixel value. The arithmetic bit region is defined by Q bits starting from the LSB though the number Q of bits of the arithmetic bit region changes depending on the determination bit region value. The number of determination bits may be not two but three. In short, the range of noise to be multiplexed suffices to change depending on a bright or dark portion in an image.

Concrete examples of this method are as follows.

A server which services images on the Internet is installed. Images containing additional information having undergone processing in FIG. 1, and pieces of specific information (image shape information M, random number key R, arithmetic bit region determination table T, and visible intensity S) for reconstructing the respective images are stored and managed. The user (client) selects and downloads a desired image. The downloaded image contains visible additional information (e.g., a photographer name and photographing date and time), as described above, and can satisfactorily present the atmosphere of the entire image. The user notifies the server that he/she wants to reconstruct the downloaded image into an original image (e.g., by clicking a corresponding button on a browser or the like). The server transmits not the original image itself but pieces of information (image shape information M, random number key R, arithmetic bit region determination table T, and visible intensity value S) which are specific to the image and necessary for reconstruction (this can prevent leakage of the original image). In transmission, these pieces of information are encrypted by a private key, which enhances security. The user PC receives these pieces of information, and performs processing of executing processing shown in FIG. 7.

As for the random number key R, a common function for generating a random number is held in the server and client, instead of transmitting a random number itself. Only an initial parameter for generating a random number is transmitted. If the same parameter is used for all images, all images held by the server can be undesirably reconstructed. To prevent this, the parameter is changed for each image.

In the first embodiment, the arithmetic bit region determination table T (in the third embodiment, three tables as shown in FIGS. 3A to 3C), and the visible intensity value S serving as information representing one of the tables to be used are transmitted for the arithmetic bit region. The arithmetic bit region (number of bits) of a pixel of interest is obtained by determination bits (in the above example, B7 and B6) and the visible intensity value S. Hence, the arithmetic bit region may be expressed by a function. Letting Q be the number of bits (Q bits from the LSB to an upper bit) of the arithmetic bit region, $Q=f(B7, B6, S)$ When determination bits are represented by the number P of bits from the MSB to a lower bit, $Q=f(P,S)$ The function f( ) is commonly held in the client and server, and the server only notifies the client of P and S in a predetermined format (e.g., encryption). The information amount can be greatly reduced, compared to transferring the table itself.

The visible intensity S may be set freely by the user or automatically. For example, the visible intensity S may be automatically determined using the range width and central luminance of the luminance distribution (histogram or the like may be created) of an original image as parameters.

Second Embodiment

The first embodiment assumes noise addition processing for each pixel. The second embodiment will describe a case wherein reversible noise is added to an image compression-coded by JPEG, JPEG 2000, or the like.

A compression coding method such as JPEG or JPEG 2000 does not define an input color component. In many cases, R (Red), G (Green), and B (Blue) color components are transformed into Y (luminance), Cb (color difference), and Cr (color difference), and then discrete cosine transform (to be referred to as DCT hereinafter) or discrete wavelet transform (to be referred to as DWT hereinafter) is executed.

Under the concept described in the first embodiment, a frequency conversion coefficient representing the luminance component of a color image compression-coded by JPEG or JPEG 2000 is used as a component for adding reversible noise. Such component can be embedded in a luminance value without any special processing.

In JPEG compression coding, compression coding is performed for each block. For example, a JPEG-compression-coded image has a minimum encoding unit (in general, 8×8 pixels), and basic compression coding processing is done for each unit. To add reversible noise in a JPEG-compression-coded image, watermark image shape information is set not for each pixel but for the minimum encoding unit. This facilitates applying the method of the first embodiment.

More specifically, in order to transform an image into frequency component data for each 8×8 pixel block, DCT transform is performed. If the pixel block is not located at a position where noise should be multiplexed, general JPEG encoding is done. If the pixel block is determined to be located at the multiplexing position, the same processing as that in the first embodiment is executed for bits which constitute a DC component value obtained as a result of DCT transform. At this time, the visible intensity value S is referred to, similar to the first embodiment.

Figure 8:
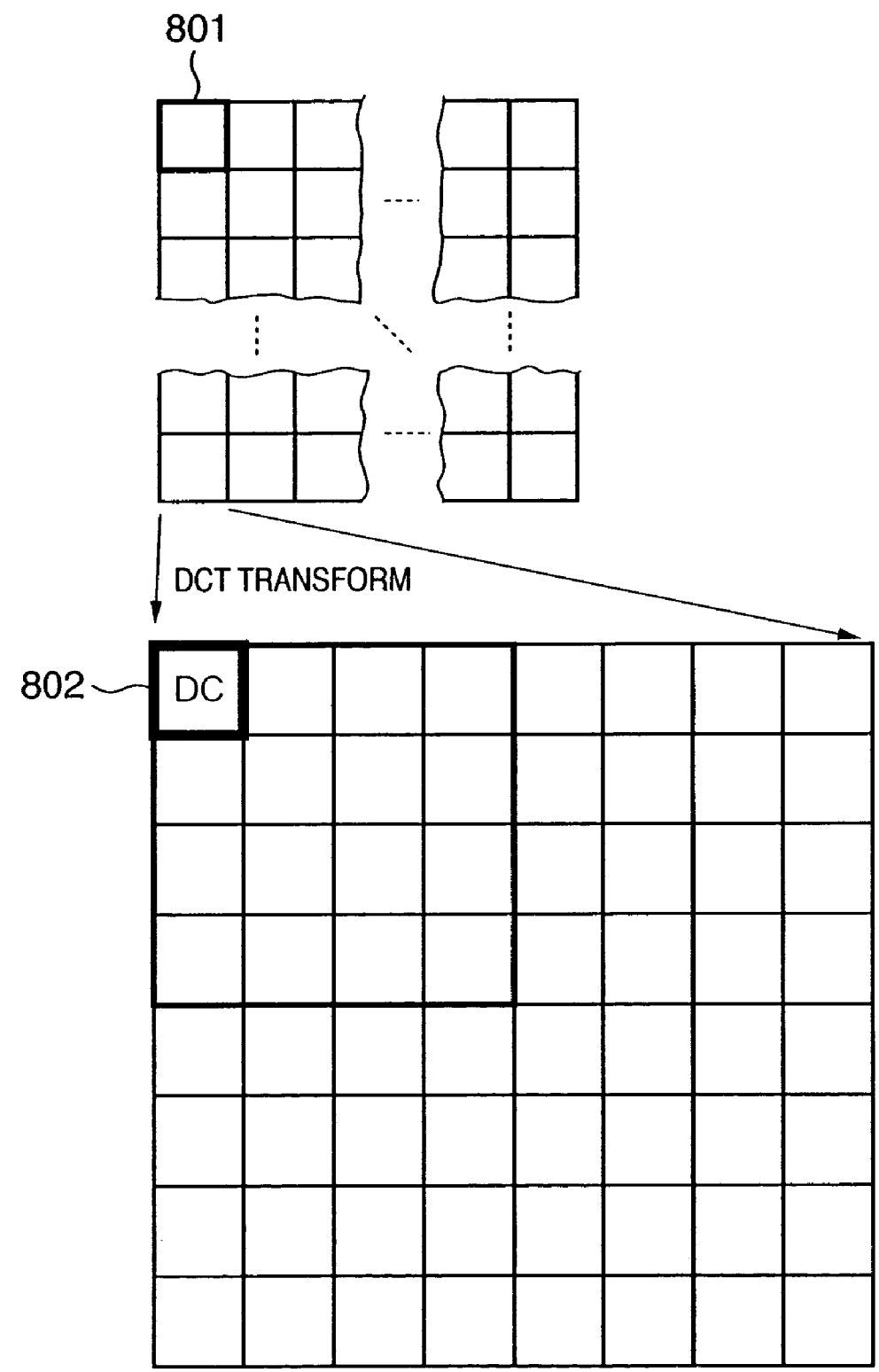
FIG. 8 is a view showing a minimum encoding unit in JPEG compression coding.

In FIG. 8, reference numeral 801 denotes an image block in the minimum encoding unit in JPEG compression coding. For a JPEG-compression-coded image, DCT (Discrete Cosine Transform) is executed within the minimum encoding unit (801). Reference numeral 802 denotes a DC component (average value) of a DCT coefficient obtained for the minimum encoding unit after DCT transform. The remaining 63 coefficients are AC coefficients.

The average value in the minimum encoding unit (801) can be changed by performing arithmetic bit region calculation processing described in the first embodiment for the DC component of the DC coefficient in the minimum encoding unit. Reversible noise can be added to each block.

Assuming that watermark image shape information is information which designates the minimum encoding unit block subjected to embedding, the first embodiment can be applied. As another merit for the first embodiment, image shape information M can be reduced. In JPEG, whether to perform multiplexing for the 8×8 pixel unit is determined. One pixel of image shape information (binary image) corresponds to 8×8 pixels of an original image (the capacity is reduced to 1/64).

To remove noise, whether a block to be processed undergoes noise embedding is determined on the basis of image shape information before inverse DCT transform. If the pixel is determined not to be subjected to noise embedding, the block is decoded by general processing. If the pixel is determined to be subjected to noise embedding, an arithmetic bit region at a DC component is obtained (specified) by looking up an arithmetic bit region determination table T determined by the visible intensity value S. Logical calculation (exclusive-OR calculation according to the first embodiment) with a serial bit sequence generated by a random number is performed to reconstruct the image. In JPEG compression coding, data is discarded by quantization processing, and the image cannot be completely reconstructed into an original image. However, also in the second embodiment, at least an image from which noise is removed to almost an original image can be obtained at the same quality as a decoding result by general JPEG.

On the other hand, a JPEG 2000-compression-coded image is compression-coded by dividing the image stepwise by the band from a low frequency to a high frequency by using DWT (Discrete Wavelet Transform) while holding image shape information.

Figure 9:
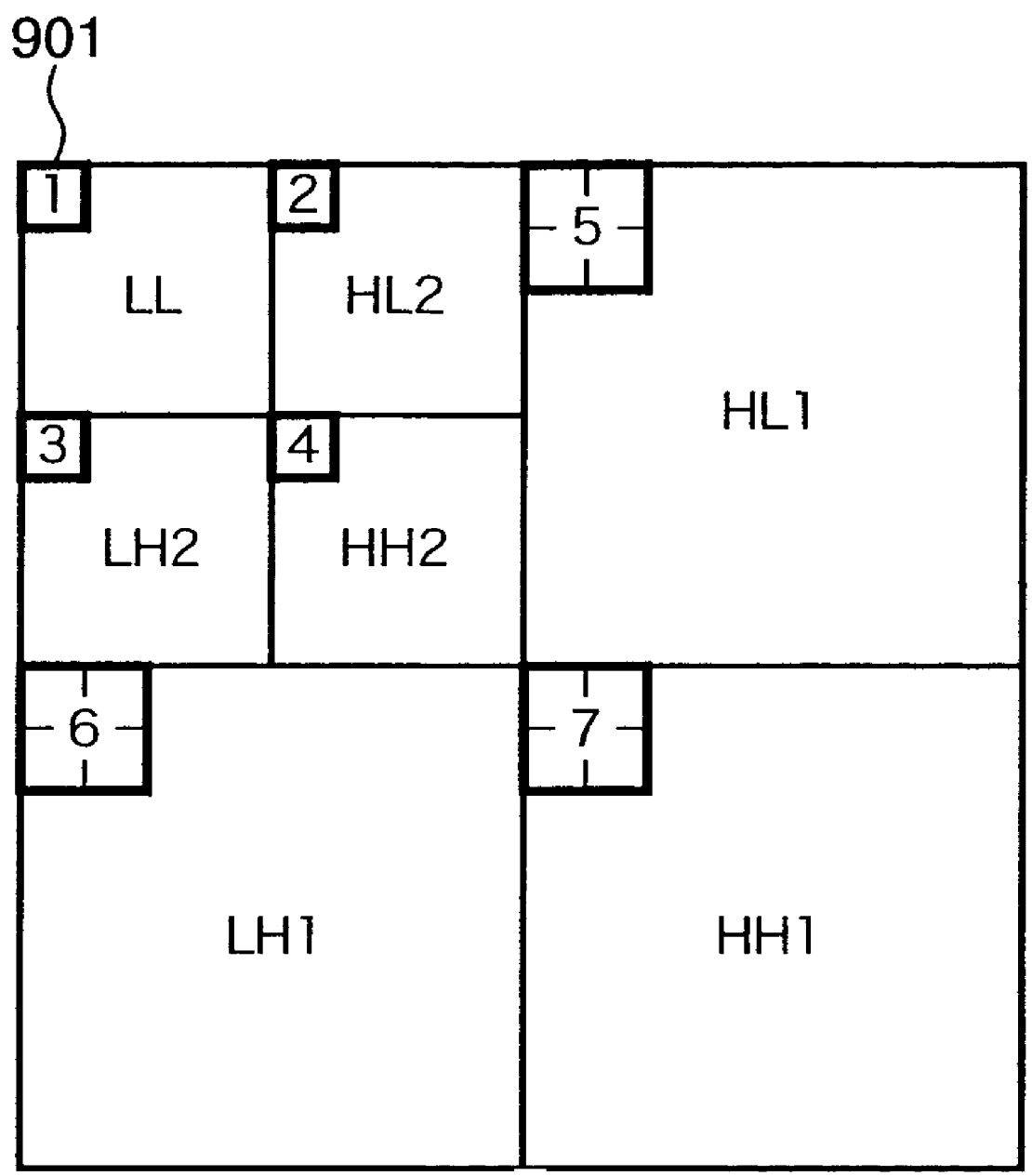
FIG. 9 is a view showing band division by discrete wavelet transform in JPEG 2000 compression coding.

FIG. 9 is a view showing band division by discrete wavelet transform in JPEG 2000 compression coding.

In discrete wavelet transform, low frequency image components which greatly influence an image concentrate on LL, and LL satisfactorily holds the image feature of an original image. If an element used for embedding is the low frequency component (LL) of DWT (Discrete Wavelet Transform), reversible noise can be added relatively similar to the first embodiment.

In FIG. 9, LL is a low-frequency-component subblock as a result of performing DWT twice. All pixels which constitute the subblock undergo the same embedding as that in the first embodiment.

When the method described in the first embodiment is applied to the DWT (Discrete Wavelet Transform) coefficient of a JPEG 2000-compression-coded image, an arithmetic bit region determination table must be designed in consideration of the fact that the DWT coefficient takes a positive or negative value.

In a JPEG 2000-compression-coded image, a 1-bit bit plane having the same size as the image size is prepared for ROI (Region Of Interest). (A JPEG 2000 basic encoding system shifts up and encodes only ROI.) When watermark image shape information is to be presented like a visible digital watermark to the image appreciator in the absence of any ROI, the watermark image shape information may be set in ROI.

For example, visible logotype information representing copyright information is described in ROI. In transmitting image information by content delivery, the logotype information can be first presented to the appreciator, explicitly presenting the copyright holder of the content to the user.

Watermark image shape information has been encoded together with an image as ROI information. Key information necessary to remove reversible noise can be reduced.

Watermark image shape information necessary to remove reversible noise can also be attached to a predetermined position such as the header of an image file. Reconstruction of a noise-added image into an original image requires only necessary key information in addition to the image file, reducing the delivered information amount.

A key (and watermark image shape information) necessary to remove reversible noise has a relatively small information amount, and can be attached to a predetermined position such as the header of an image file. In order to enable only a specific user to remove reversible noise, the key (and watermark image shape information) may be encrypted by predetermined cryptography (e.g., public key cryptography), and attached to a predetermined position such as the header of an image file.

The first embodiment has described only an exclusive-OR (XOR calculation) as cryptography. The present invention can also adopt secret key cryptography such as DES or public key cryptography by collecting a plurality of arithmetic bit regions into a predetermined processing unit (e.g., 64 bits).

In the use of secret key cryptography such as DES belonging to block cryptography of performing processing for each predetermined processing unit, if the number of collected bits does not reach a predetermined processing unit, "0"s or "1"s are padded by a necessary number of bits to satisfy the predetermined unit and then encryption is performed. A bit which cannot be stored at an original pixel position may be attached to a predetermined file position such as a header.

Alternatively, cryptography belonging to stream cryptography (belonging to secret key cryptography) capable of processing for one to several bits may be employed.

In this case, in the first embodiment, not a random number key, but a secret key for secret key cryptography, or a public key in embedding and private key in extraction for public key cryptography are input by initial setting.

The second embodiment has exemplified DES as cryptography, but may adopt another secret key cryptography such as AES, FEAL, IDEA, RC2, RC4, RC5, MISTY, Caesar cryptography, Viginere cryptography, Beaufort cryptography, Playfair cryptography, Hill cryptography, or Vernam cryptography.

The second embodiment has exemplified a still image, but the same principle can also be applied to a moving image. For example, in MPEG compression coding, reversible noise can be relatively easily embedded using an intermediate frame as an embedding target. In Motion JPEG 2000, reversible noise is repetitively embedded by the same method as that of JPEG 2000 compression coding in the time frame direction. Hence, addition of reversible noise to a moving image also falls within the scope of the present invention.

The present invention has mainly described addition of reversible noise corresponding to the pixel value of an image. A visible digital watermark can also be embedded by adding strong noise to watermark image shape information. Embedding of a visible digital watermark using the above-described method of the present invention also falls within the scope of the present invention.

As is apparent from the above embodiments, most of the embodiments can be realized by software. In general, when a computer program is installed into a general-purpose information processing apparatus such as a personal computer, a computer-readable storage medium such as a floppy® disk, CD-ROM, or semiconductor memory card is set in the apparatus to execute an install program or copy the program to the system. Such computer-readable storage medium also falls within the scope of the present invention.

An OS or the like running on the computer performs part or all of processing. Alternatively, program codes read out from the storage medium are written in the memory of a function expansion board inserted into the computer or the memory of a function expansion unit connected to the computer, and the CPU of the function expansion board or function expansion unit performs part or all of actual processing on the basis of the instructions of the program codes. Also in this case, functions equal to those of the embodiments can be realized, the same effects can be obtained, and the objects of the present invention can be achieved.

As described above, according to the embodiments, an input image and key are input. Of the building values of the building components of the input image, some of them are referred to. Calculation based on the key is executed to change the building values. High-security reversible noise can be embedded in an original image in accordance with the feature of the input image, satisfactorily protecting copyrights.

The reversible noise-embedded image and key are input, and calculation reverse to the above calculation is executed. As a result, the reversible noise can be removed to reconstruct the original image.

As has been described above, according to the present invention, while the atmosphere of multilevel image data subjected to embedding is maintained, noise can be multiplexed on the image data to reversibly embed visible additional information with a noise-multiplexed distribution. By removing the additional information, an original image or an image almost identical to the original image can be reconstructed.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which converts multilevel image data into frequency component data for each pixel block of a predetermined size to compression-code the multilevel image data, and multiplexes noise on the multilevel image to embed visible additional information with a noise-multiplexed distribution, comprising:
input means for inputting, as the additional information, information representing whether or not to multiplex noise for each pixel block of the predetermined size;
determination means for determining on the basis of the input additional information whether a pixel block of interest is located at a position where noise is to be multiplexed;
specifying means for, when said determination means determines that the pixel block of interest is located at the position where noise is to be multiplexed, specifying a second bit region where noise is to be multiplexed, on the basis of a state of a first bit region in data which constitutes a low frequency component after conversion of the pixel block of interest; and
change means for reversibly changing bit information for the second bit region in the data of the low frequency component specified by said specifying means.

2. The apparatus according to claim 1, wherein the conversion into the frequency component includes orthogonal transform, and the low frequency component includes a DC component after orthogonal transform.

3. The apparatus according to claim 1, wherein the conversion into the frequency component includes wavelet transform, and the low frequency component includes data of a block of a low frequency component that is generated by wavelet transform a plurality of number of times.

4. The apparatus according to claim 1, wherein, in a case where the multilevel image data includes multilevel image data using a luminance value as a reference, the first bit region includes a predetermined number of upper bits including a most significant bit, and the second bit region includes lower m bits which include a least significant bit and change in accordance with a value of the second bit region.

5. The apparatus according to claim 1, wherein the image processing apparatus further comprises means for setting information on an intensity for multiplexing noise, and said specifying means specifies the second bit region on the basis of the set intensity information and the state of the first bit region.

6. An image processing apparatus which removes visible additional information from multilevel image data that is compression-coded by reversibly embedding noise, multiplexing the visible additional information, and converting the data into frequency component data for each pixel block of a predetermined size, comprising:

input means for inputting, as the additional information, information representing whether or not to multiplex noise for each pixel block of the predetermined size;

determination means for determining on the basis of the input additional information whether a pixel block of interest is located at a position where noise is multiplexed;

specifying means for, when said determination means determines that the pixel block of interest is located at the position where noise is multiplexed, specifying a noise-multiplexed second bit region on the basis of a first bit region in data which constitutes a low frequency component after frequency conversion of the pixel block of interest; and reconstruction means for performing conversion inverse to noise multiplexing to reconstruct a state of the second bit region of the pixel block of interest specified by said specifying means into a state before multiplexing.

7. An image processing method of converting multilevel image data into frequency component data for each pixel block of a predetermined size to compression-code the multilevel image data, and multiplexing noise on the multilevel image to embed visible additional information with a noise-multiplexed distribution, comprising:

an input step of inputting, as the additional information, information representing whether or not to multiplex noise for each pixel block of the predetermined size;

a determination step of determining on the basis of the input additional information whether a pixel block of interest is located at a position where noise is to be multiplexed;

a specifying step of, when the pixel block of interest is determined in the determination step to be located at the position where noise is to be multiplexed, specifying a second bit region where noise is to be multiplexed, on the basis of a state of a first bit region in data which constitutes a low frequency component after conversion of the pixel block of interest; and a change step of reversibly changing bit information bit information for the second bit region in the data of the low frequency component specified in the specifying step.

8. An image processing method of removing visible additional information from multilevel data that is compression-coded by reversibly embedding noise, multiplexing the visible additional information, and converting the data into frequency component data for each pixel block of a predetermined size, comprising:

an input step of inputting, as the additional information, information representing whether or not to multiplex noise for each pixel block of the predetermined size;

a determination step of determining on the basis of the input additional information whether a pixel block of interest is located at a position where noise is multiplexed;

a specifying step of, when the pixel block of interest is determined in the determination step to be located at the position where noise is multiplexed, specifying a noise-multiplexed second bit region on the basis of a state of a first bit region in data which constitutes a low frequency component after frequency conversion of the pixel block of interest; and a reconstruction step of performing conversion inverse to noise multiplexing to reconstruct a state of the second bit region of the pixel block of interest specified in the specifying step into state before multiplexing.

9. A computer program, embodied in a computer-readable medium, for causing an apparatus to function as an image processing apparatus which converts multilevel image data into frequency component data for each pixel block of a predetermined size to compression-code the multilevel image data, and multiplexes noise on the multilevel image to embed visible additional information with a noise-multiplexed distribution, wherein said program causes the apparatus to function as:

input means for inputting, as the additional information, information representing whether or not to multiplex noise for each pixel block of the predetermined size;

determination means for determining on the basis of the input additional information whether a pixel block of interest is located at a position where noise is to be multiplexed;

specifying means for, when said determination means determines that the pixel block of interest is located at the position where noise is to be multiplexed, specifying a second bit region where noise is to be multiplexed, on the basis of a state of a first bit region in data which constitutes a low frequency component after conversion of the pixel block of interest; and change means reversibly changing bit information for the second bit region in the data of the low frequency component specified by said specifying means.

10. A computer-readable storage medium storing a computer program defined in claim 9.

11. A computer program, embodied in a computer-readable medium, for causing an apparatus to function as an image processing apparatus which removes visible additional information from multilevel image data that is compression-coded by reversibly embedding noise, multiplexing the visible additional information, and converting the data into frequency component data for each pixel block of a predetermined size, functioning as:

input means for inputting, as the additional information, information representing whether or not to multiplex noise for each pixel block of the predetermined size;

determination means for determining on the basis of the input additional information whether a pixel block of interest is located at a position where noise is multiplexed;

specifying means for, when said determination means determines that the pixel block of interest is located at the position where noise is multiplexed, specifying a noise-multiplexed second bit region on the basis of a state of a first bit region in data which constitutes a low frequency component after frequency conversion of the pixel block of interest; and reconstruction means for performing conversion inverse to noise multiplexing to reconstruct a state of the second bit region of the pixel block of interest specified by said specifying means into a state before multiplexing.

12. A computer-readable storage medium storing a computer program defined in claim 11.

* * * * *

UNITED STATES PATENT AND TRADEMARK OFFICE
CERTIFICATE OF CORRECTION

| | |
|---|---|
| PATENT NO. | : 7,269,273 B2 |
| APPLICATION NO. | : 10/600533 |
| DATED | : September 11, 2007 |
| INVENTOR(S) | : Tomochika Murakami |

It is certified that error appears in the above-identified patent and that said Letters Patent is hereby corrected as shown below:

(56) References Cited
"JP 05-110971 4/1993" should read --JP 5-110971 4/1993--.

Col. 4, line 30, "perception to" should read --perception of--.

Col. 12, line 46, insert --¶-- after "(ROI.).".

Col. 15, line 45, "first" should read --state of a first--.

Col. 16, line 9, "bit" (second occurrence) should be deleted.

line 10, "information" should be deleted.

line 35, "perfornning" should read --performing--.

line 38, "state" should read --a state--.

Signed and Sealed this

Seventeenth Day of June, 2008

JON W. DUDAS
*Director of the United States Patent and Trademark Office*